US008248421B2

(12) United States Patent
Whitby-Strevens et al.

(10) Patent No.: US 8,248,421 B2
(45) Date of Patent: Aug. 21, 2012

(54) DISPLAYPORT CONTROL AND DATA REGISTERS

(75) Inventors: Colin Whitby-Strevens, Ben Lomond, CA (US); George C. Kyriazis, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 957 days.

(21) Appl. No.: 12/242,800

(22) Filed: Sep. 30, 2008

(65) Prior Publication Data

US 2010/0079475 A1 Apr. 1, 2010

(51) Int. Cl.
*G06F 15/00* (2006.01)
*G06F 3/00* (2006.01)
*G06T 1/00* (2006.01)

(52) U.S. Cl. .......................................... 345/501; 710/15

(58) Field of Classification Search ........................ None
See application file for complete search history.

(56) References Cited

U.S. PATENT DOCUMENTS 5,465,333 A 11/1995 Olnowich
5,774,703 A 6/1998 Weiss et al.
5,815,734 A 9/1998 Lee et al.
6,209,042 B1 3/2001 Yanagisawa et al.
6,233,637 B1 5/2001 Smyers et al.
6,240,480 B1 5/2001 Wong et al.
6,738,856 B1 5/2004 Milley et al.
6,859,884 B1 2/2005 Sullam
6,914,586 B2 * 7/2005 Burkhardt ........................ 345/87
7,035,956 B2 4/2006 Tanaka
7,167,996 B2 1/2007 Takahashi et al.
7,562,161 B2 * 7/2009 Maciesowicz .................... 710/9
7,822,879 B2 * 10/2010 Lida et al. ......................... 710/3
2004/0239676 A1 * 12/2004 Yoo ............................... 345/501
2005/0223132 A1 10/2005 Toda
2007/0067544 A1 3/2007 Isani et al.
2007/0106959 A1 5/2007 McGowan
2008/0162725 A1 * 7/2008 Kambhatla .................. 709/245
2008/0250184 A1 10/2008 Sheafor et al.

OTHER PUBLICATIONS

VESA; DisplayPort Link Layer Compliance Test Standard; Version 1.0; Sep. 14, 2007.*

* cited by examiner

*Primary Examiner* — Kee M Tung
*Assistant Examiner* — Carlos Perromat
(74) *Attorney, Agent, or Firm* — Kilpatrick Townsend & Stockton LLP

(57) ABSTRACT

Circuits, methods, and apparatus for registers to store information that may be used by devices in a display system. One example provides control and data registers in a display to store information pertaining to a display system that includes the display. The registers can store attributes of the display, a host device, and a branch device. The information may include an organizationally unique identifier, chip identification, major and minor chip revision information, and firmware major and minor revision information.

19 Claims, 8 Drawing Sheets

| REGISTER 510 | PURPOSE 520 |
|---|---|
| 00000-000FF | CAPABILITIES |
| 00100-001FF | LINK CONFIGURATION |
| 00200-002FF | LINK STATUS |
| 00300-003FF | SOURCE (HOST) SPECIFIC |
| 00400-004FF | SINK (DISPLAY) SPECIFIC |
| 00500-005FF | BRANCH (ADAPTER) SPECIFIC |

| REGISTER 510 | PURPOSE 520 |
|---|---|
| 00000-000FF | CAPABILITIES |
| 00100-001FF | LINK CONFIGURATION |
| 00200-002FF | LINK STATUS |
| 00300-003FF | SOURCE (HOST) SPECIFIC |
| 00400-004FF | SINK (DISPLAY) SPECIFIC |
| 00500-005FF | BRANCH (ADAPTER) SPECIFIC |

Figure 5

| OFFSET 610 | PURPOSE 620 |
| --- | --- |
| 00-02H | OUI |
| 03-0AH | CHIP ID |
| 0BH | CHIP MAJOR REVISION |
| 0CH | CHIP MINOR REVISION |
| 0DH | FIRMWARE/SOFTWARE MAJOR REVISION |
| 0EH | FIRMWARE/SOFTWARE MINOR REVISION |

Figure 6

DISPLAYPORT CONTROL AND DATA REGISTERS

BACKGROUND

Computer display systems have advanced a tremendous amount since the days of the simple cathode-ray tube monitor. New flat panel monitors have a myriad of capabilities and can support a wide range of resolutions and refresh rates. They are being driven by signals compliant with new standards, such as DisplayPort, and other new standards that are currently or will be developed are sure to follow.

These computer display system may include a host or source device and a display or sink device. Other systems may use a branch device functioning as a repeater when a display is located remotely from the host. Other systems may include a branch device operating as an adapter such that a host providing DisplayPort signals can drive a legacy monitor. Still other systems may include a branch device to allow a host to provide graphics information to more than one display.

In each of these systems, it can be advantageous for a host to be able to access information regarding the display and any intervening branch device. Currently, extended display identification data (EDID) circuits are used to provide information regarding a display to a host device.

However, these extended display identification data circuits are limited in the information they can provide. Specifically, they are limited to providing supported refresh rate and resolutions, among other information. Moreover, the extended display identification data circuits are limited to information pertaining to the display device to be read by a host device; information regarding other devices is not available to the host, and this information is not available to other devices besides the host.

Thus, what is needed are circuits, methods, and apparatus for making other types of information regarding devices in a display system available to a host device, as well as making other types of information regarding devices in a display system available to other devices in the display system.

SUMMARY

Accordingly, embodiments of the present invention provide circuits, methods, and apparatus for registers to store information that may be used by devices in a display system. An exemplary embodiment of the present invention provides registers, which may be referred to as DisplayPort control and data (DPCD) registers. These registers store information pertaining to the devices in a display system. These registers may be located on a display or other device in the display system.

In various embodiments of the present invention, this information may include registers for storing data regarding capabilities of the display. Other registers may store information pertaining to the configuration and status of a link between the display and host devices. Still other embodiments of the present invention provide DisplayPort control and data registers for storing a manufacturer's organizationally unique identifier (OUI.) Make and model information of the display may also be included. This information may include one or more text strings that can be read and provided directly for display.

In many systems, it is desirable to know the identity and version of one or more chips and firmware used by a display. This information may be used by a host to avoid known errors that may reside in the display's chips and firmware. Also, the host may use this information to take advantage of one or more capabilities of the display. Moreover, when error conditions occur, it is useful to be able to specify the identity and version of the chips and firmware involved as part of any error reporting. Also, a user may attempt to determine compatibility between one or more devices in a display system. Knowing the specific chip and firmware used by a display enhances this compatibility testing.

Accordingly, another exemplary embodiment of the present invention provides DisplayPort control and data registers for storing identification information for one or more chips used in the display. Registers may be located on a display or other display device. Also, additional registers may be used to track major and minor chip revision information. Another exemplary embodiment of the present invention provides DisplayPort control and data registers for storing identification information for the firmware used in the display. Separate registers may be used to track major and minor chip revision information.

In another exemplary embodiment of the present invention, information regarding a host device can be stored on the display or other display system device. This information may be used to work around errors, employ enhancements, report errors, and test compliance as above.

Accordingly, another exemplary embodiment of the present invention provides DisplayPort control and data registers for storing identification information for one or more chips used in a host. Also, additional registers may be used to track major and minor chip revision information. Another exemplary embodiment of the present invention provides DisplayPort control and data registers for storing identification information for the firmware used by the host. Separate registers may be used to track major and minor chip revision information.

In another exemplary embodiment of the present invention, information regarding a branch device can be stored on the display or other display system device. This information may be used to work around errors, employ enhancements, report errors, and test compliance as above.

Accordingly, another exemplary embodiment of the present invention provides DisplayPort control and data registers for storing identification information for one or more chips used in a branch device. Also, additional registers may be used to track major and minor chip revision information. Another exemplary embodiment of the present invention provides DisplayPort control and data registers for storing identification information for the firmware used by the branch device. Separate registers may be used to track major and minor chip revision information.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIG. 5 illustrates DisplayPort control and data registers employed by a specific embodiment of the present invention;

FIG. 6 illustrates information that may be stored in source, sink, and branch control and data registers according to an embodiment of the present invention;

DESCRIPTION OF EXEMPLARY EMBODIMENTS

Figure 1:
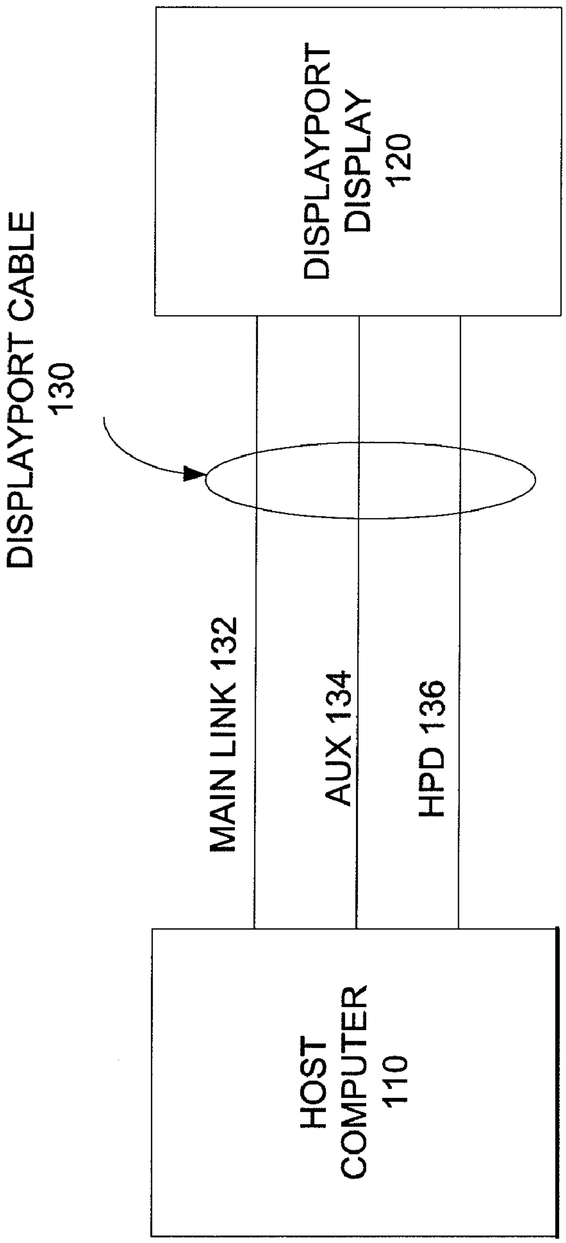
Prior Art Figure 1
FIG. 1 illustrates a display system that is improved by the incorporation of an embodiment of the present invention.

FIG. 1 illustrates a display system that is improved by the incorporation of an embodiment of the present invention. This system includes a host computer (or source) 110 coupled to a display (or sink) 120 via a DisplayPort cable 130. The DisplayPort cable 130 includes conductors for a main link 132, auxiliary channel 134, and hot-plug detect 136. This figure, as with the other included figures, is shown for illustrative purposes and does not limit either the possible embodiments of the present invention or the claims.

Graphics information is provided by the host computer 110, typically using a graphics processor (not shown,) to a display 120 over a main link 132. The main link 132 may utilize one or more lanes of data. Specifically, one, two, or four lanes of data may convey graphics information from the host computer 110 to the display 120.

An auxiliary channel 134 is used to convey support information between the host computer 110 and the display 120. The hot-plug detect line 136 is used to inform the host computer 110 when a display 120 is connected or disconnected.

In this example, a host computer 110 provides graphics data to the display 120. In other embodiments of the present invention, other devices, such as set-top boxes, satellite receivers, and other systems, may provide the graphics information to the display 120. Also, while this and the other systems are shown as including DisplayPort devices and cables, embodiments of the present invention may be used to improve other types of systems that are currently available, are currently being developed, or will be developed in the future.

In some circumstances, it may be desirable for a display to be remote from a computer. This may be the case in public venues, elevators, and other circumstances. In such a situation, an adapter or repeater, also known as a branch device, may be used to transmit the graphics data over a distance. In other circumstances, it may be desirable to use more than one display in a display system. This may be the case in a workstation environment. In such a situation, a branch device may be used to provide data to more than one display. An example is shown in the following figure.

Figure 2:
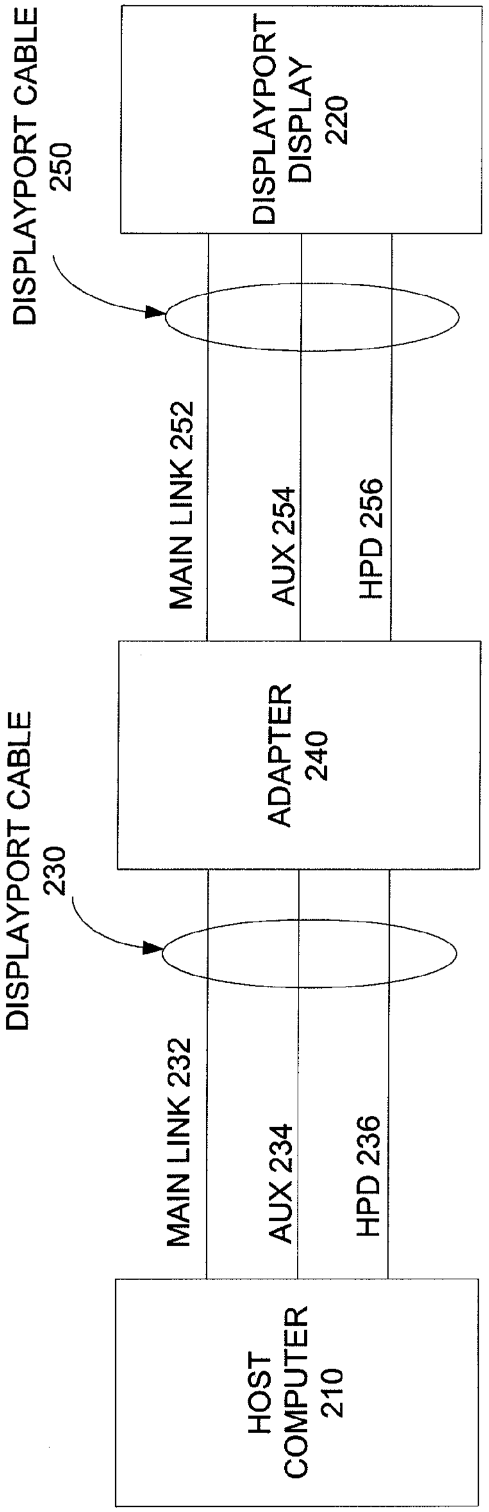
Prior Art Figure 2
FIG. 2 illustrates another display system that is improved by the incorporation of an embodiment of the present invention.

FIG. 2 illustrates a display system that is improved by the incorporation of an embodiment of the present invention. This figure includes a host computer 210 communicating with an adapter 240 over a DisplayPort cable 230, the adapter 240 communicating with a display 220 over a DisplayPort cable 250. While only one display 220 is shown, in other examples, the adapter 240 may drive more than one display 220. The host computer 210 provides graphics information to the adapter 240 over the DisplayPort cable 230. The DisplayPort cable 230 includes lines for a main link 232, auxiliary channel 234, and hot-plug detect 236. The adapter 240 in turn provides graphics information to the DisplayPort display 220 over a DisplayPort cable 250. DisplayPort cable 250 includes lines for a main link 252, auxiliary channel 254, and hot plug detect 256.

In some situations, it is desirable to drive a legacy display, such as a Video Graphics Array (VGA), Digital Visual Interface (DVI), or other display. In this case, branch device or adapter may be used to translate DisplayPort signals to VGA or DVI signals. The branch device may act as a converter, and it may also function as a repeater to provide signals to a display that is remotely located from the computer. As before, more than one display may be driven, wherein one or more displays are VGA, DVI, or DisplayPort compatible.

Figure 3:
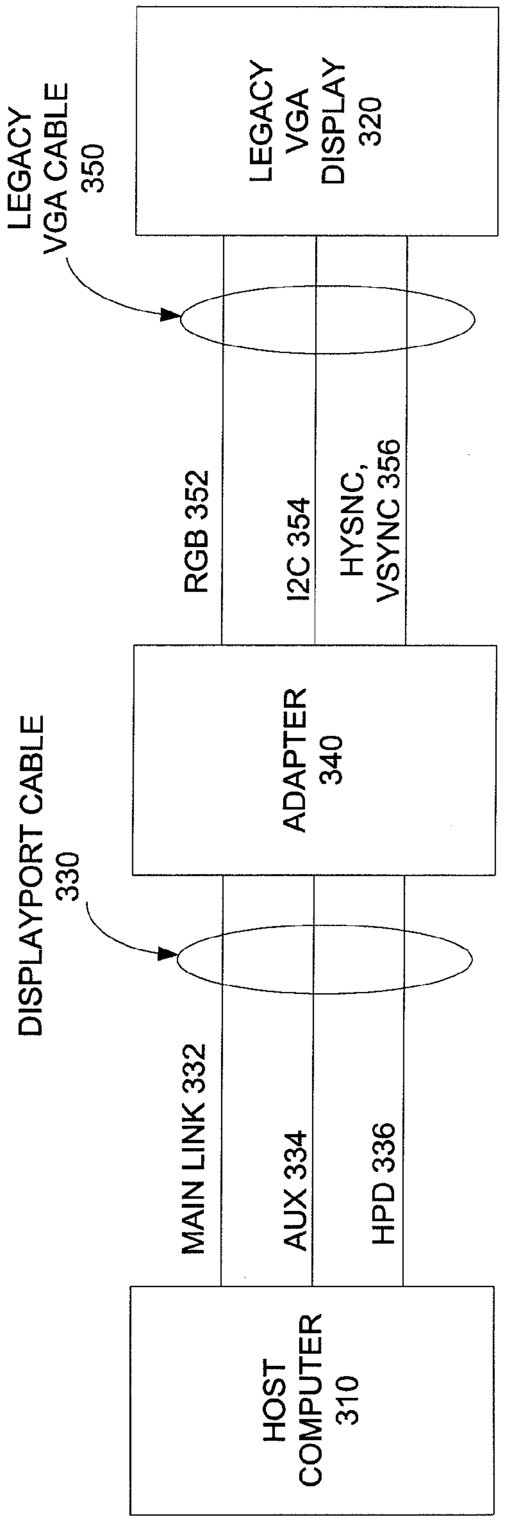
Prior Art Figure 3
FIG. 3 illustrates another display system that is improved by the incorporation of an embodiment present invention.

FIG. 3 illustrates a display system that is improved by the incorporation of an embodiment present invention. This figure includes a host computer 310 communicating with an adapter 340 over a DisplayPort cable 330. The adapter 340 communicates with a legacy display 320 over a legacy cable 350. In this specific example, the legacy display 320 and legacy cable 350 are a VGA display and a VGA cable. In other examples, the adapter 340 may drive more than one display.

The host computer 310 communicates with the adapter 340 over a DisplayPort cable 330, which includes lines for a main link 332, auxiliary channel 334, and hot-plug detect 336. The adapter 340 communicates in turn within the legacy VGA display 320 over VGA cable 350. VGA cable 350 includes RGB lines and their respective returns 352, $I^2C$ channel 354, and horizontal sync and vertical sync lines 356.

Legacy displays, such as the legacy VGA display 320, often include extended display identification data circuitry. Extended display identification data circuits allows a host computer to determine a display's capabilities. For example, the supported resolutions, refresh rates, and other information is stored using extended display identification data circuitry. This circuitry is accessed over the $I^2C$ lines 354.

This extended display identification data circuitry is a well-known commodity and has been used in displays for many years. For this reason, it is desirable to continue to make use of this circuitry even in newer displays. However, existing circuitry does not convey many types of information that are useful when using these newer displays. Accordingly, embodiments of the present invention provide additional registers for storing this information. An example is shown in the following figure.

Figure 4:
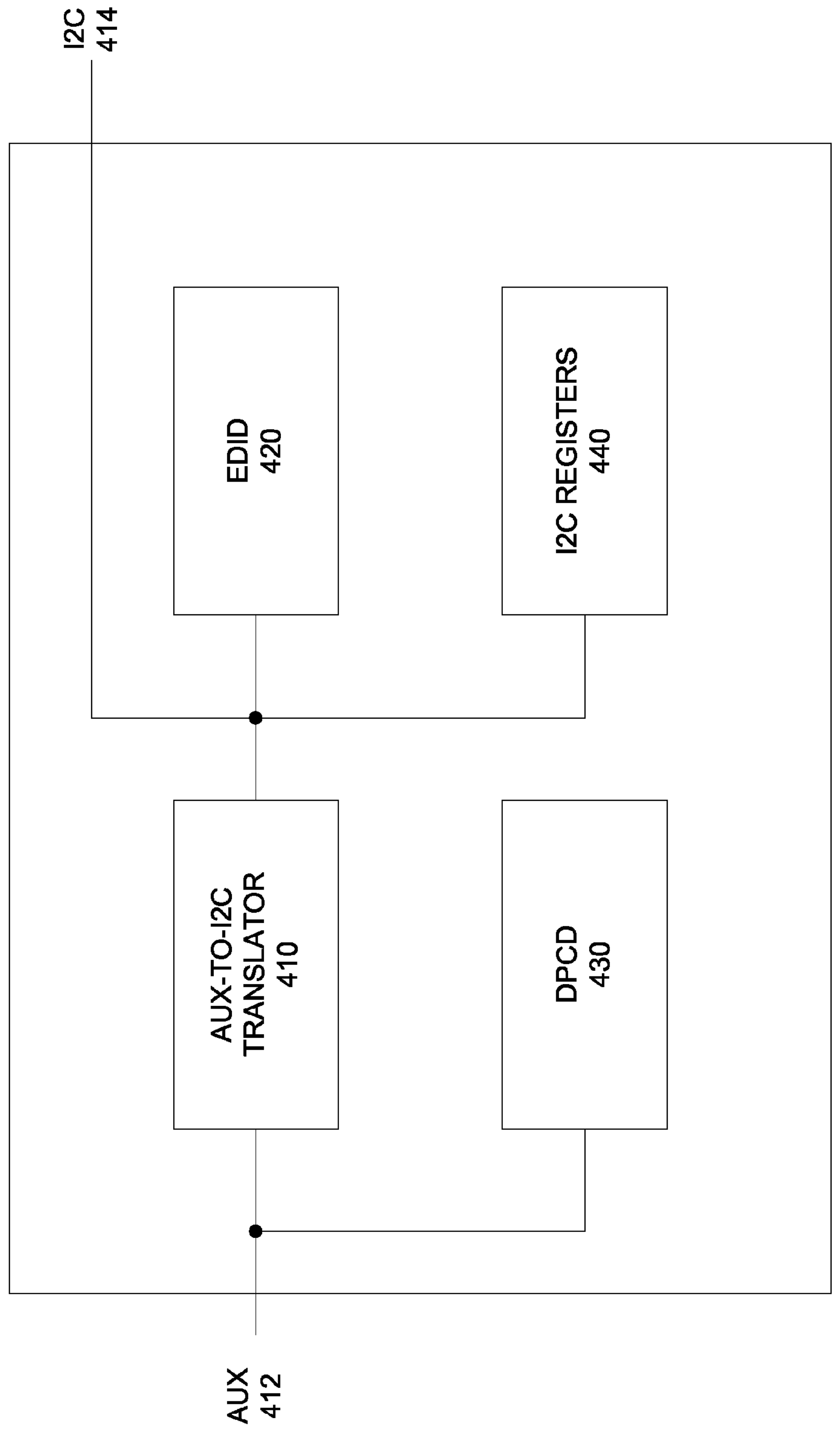
FIG. 4 illustrates circuitry that may be employed by a device in a display system according to an embodiment of the present invention.

FIG. 4 illustrates circuitry that may be employed by an adapter or display according to an embodiment of the present invention. Again, with these newer DisplayPort displays, an auxiliary channel is used to communicate support information between a host and a display. However, the current extended display identification data circuitry sends and receives data using the $I^2C$ protocol. Accordingly, the circuitry in FIG. 4 includes an auxiliary-to-$I^2C$ translator 410. The auxiliary-to-$I^2C$ translator 410 provides and receives auxiliary channel signals on lines 412 and provides and receives $I^2C$ signals on line 414. Specifically, the auxiliary channel signals on line 412 employ a tunneling protocol, that is, $I^2C$ signals are sent using auxiliary channel compatible signaling. The extended device identification circuitry 420 provides information regarding supported resolutions, refresh rates, as well as other information. The extended device identification circuitry 420 may also employ $I^2C$ registers 440. These registers may store information such as monitor settings including brightness, speaker volume, and other information.

Again, the extended display identification data circuitry 420 fails to include a great deal of information that may be useful in systems employing these newer displays. For example, it may be desirable for a host to be able determine the manufacturer and model of the display. It may also be desirable to be able to read this information as a text field that can be directly displayed to a user. It may also be desirable to be able to access chip identification information, as well as chip and firmware revision information. This information may be useful in allowing a device in a display system to compensate for known errors in one or more other devices. It may also allow the other devices in a display system to exploit included features. This information can also be used in error reporting and compliance testing.

Accordingly, the circuitry in FIG. 4 includes DisplayPort control and data registers 430. These registers are specific to DisplayPort, therefore they are connected to the auxiliary data input 412 rather than the $I^2C$ bus 414. In other embodiments of the present invention, the DisplayPort control and data registers 430 are coupled to the $I^2C$ bus 414. These registers may include information regarding the manufacture and model, as well as information regarding software and firmware revisions. Information regarding the source or host devices, sink or display devices, and branches or adapters, may be included.

Again, in this example, the DisplayPort control and data registers 430 are coupled directly to the auxiliary bus 412 rather than the $I^2C$ bus 414. The auxiliary bus 412 is typically capable of operating at frequencies in the 1 MB range, while the $I^2C$ bus 414 is limited to frequencies in the 1-100 kB range. Accordingly, coupling the DisplayPort control and data registers 430 directly to the auxiliary bus 412 improves data transfer rates for the DisplayPort control and data registers 430.

In systems with a host and a display, the host may write information to the source specific registers. In systems with a host, branch, and display, source and branch information may be written by the source via the branch device, or by the branch device itself Examples of these registers are shown in the following figures.

FIG. 5 illustrates DisplayPort control and data registers employed by a specific embodiment of the present invention. It will be appreciated that the registers shown and their purposes may vary in different embodiments of the present invention.

In this example, registers are included for storing information regarding the capabilities of the display. Other registers are included for link configuration information. These registers may include information regarding the number of main link channels that may be supported, as well as other information. Registers pertaining to the link status are also included. These may indicate whether the link is operational or in a lower power or sleep mode.

Other registers are included to store information regarding the source or host, sink or display, and branch or adapter. Examples of what may be stored in these registers are shown in the following figure.

FIG. 6 illustrates information that may be stored in source, sink, and branch control and data registers according to an embodiment of the present invention. In various embodiments of the present invention, some or all of this information may be stored regarding the source, sink, and branch components. In other embodiments of the present invention, only various subsets of this information may be stored.

In this example, registers are included to store the manufacturer's organizationally unique identifier. Other registers include storage for chip identification. Since these chips are often revised, the major revisions of the chip may be tracked. Minor revisions to the chip, such as metal mask changes or bonding options (which may also be major revisions,) may also be tracked. Similarly, firmware or software revisions, both major and minor, may be stored in the DisplayPort control and data registers.

Again, use of this information allows components in a display system to determine if workarounds to known problems with one or more other devices in the display system can be implemented. Similarly, this information may allow components in a display system to determine if features in one or more other devices in the display system may be advantageously employed. Similarly, as errors occur, the accuracy of the reporting of these errors is greatly enhanced if the chip identification and chip and firmware version information is known. Also, on occasion, it is desirable to determine whether one or more devices in a display system are compatible with a new device. This compliance testing can be greatly enhanced if chip identification and chip and firmware version information are accurately known. An example is shown in the following figure.

Figure 7:
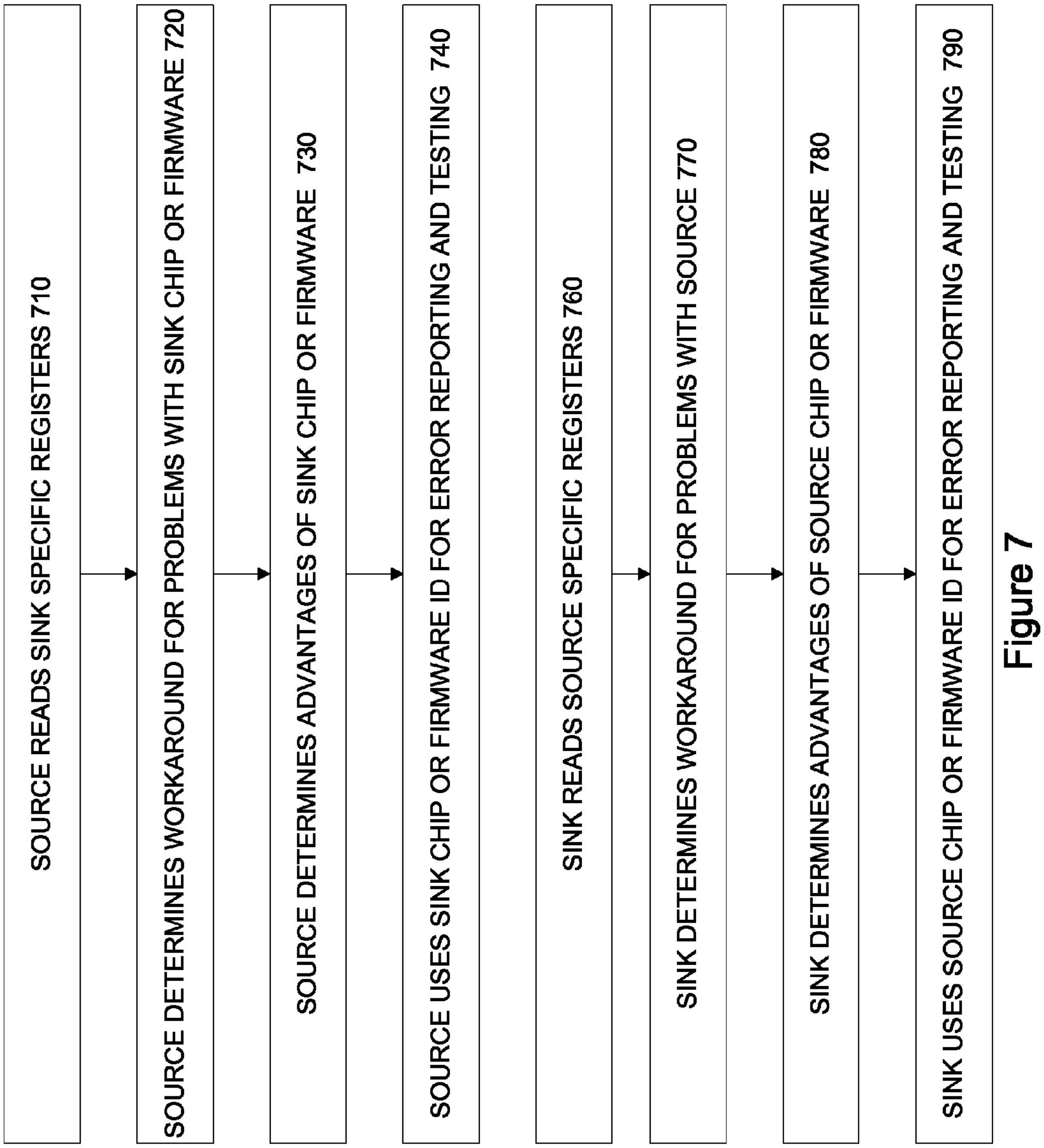
FIG. 7 is a flowchart illustrating a device determining the attributes of other devices in a display system according to an embodiment of the present invention.

FIG. 7 is a flowchart illustrating a device determining the capabilities of other devices in a display system according to an embodiment of the present invention. In this specific example, the display system concludes a source (host) and a sink (display.)

In act 710, a source reads the sink specific registers. From that is, the source determines if a workaround for a known problem with the sink chip or firmware is available in act 720. In act 730, the source determines advantages and capabilities of the sink chip or firmware. For example, the sink registers may contain information regarding procedures to be followed during a firmware update for the sink circuitry. This information may be used when the source firmware is updated. Also, the sink may have splash or screensaver images stored in a memory. If the source determines that the sink has stored this information, the source does not need to provide it to the sink. As a result, power can be saved during the times the screensaver is displayed by the sink.

In a similar way, the sink reads source specific registers in act 760. The sink determines whether a workaround is needed for problems with the source 770. The sink determines advantages or capabilities of the source chip or firmware in act 780. In act 790, the sink uses source chip or firmware identification information for error reporting and compliance testing.

Again, in some systems improved by incorporation of the present invention, a branch or adapter may be placed between the source or host and display or sink. In this situation, each device may read information regarding the other devices. Examples are shown in the following figure.

Figure 8:
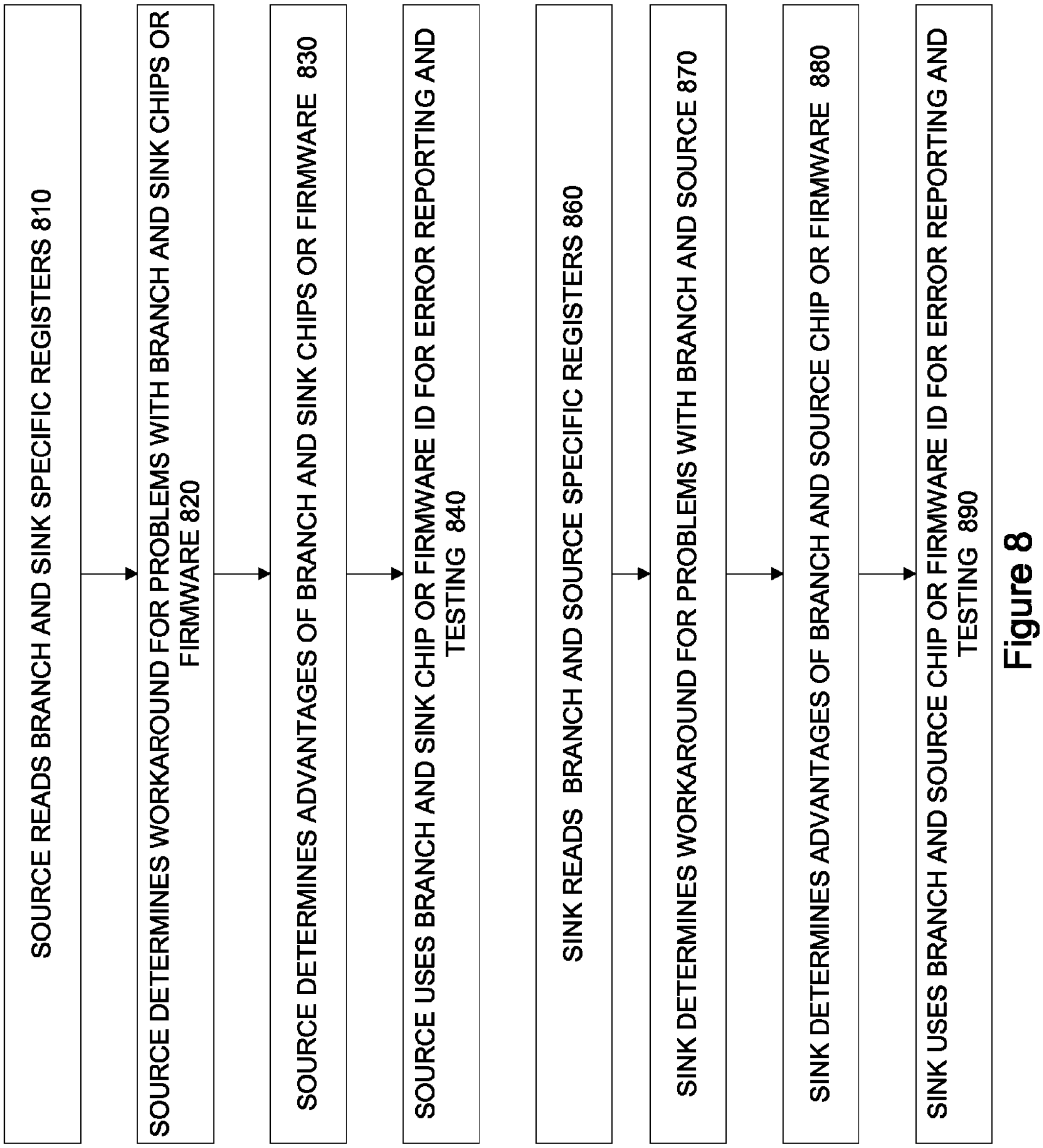
FIG. 8 is a flowchart illustrating a device determining the attributes of other devices in a display system according to an embodiment of the present invention.

FIG. 8 is a flowchart illustrating a device determining information regarding other devices in a display system according to an embodiment of the present invention. In act 810, a source reads branch and sink specific registers. The source can determine workarounds for a problem with the branch and sink chips and firmware in act 820. The source may determine advantages or capabilities of the branch and sink chips or firmware in act 830. The source can use the branch and sink chip identification information for error reporting and compliance testing in act 840.

Similarly, the sink can read branch and source specific registers in act 860. The sink may determine workarounds for problems with the branch and source in act 870. In act 880, the sink can determine advantages or capabilities of the branch in source chip or firmware. The sink can use the branch and source chip or firmware identification information for error reporting and compliance testing in act 890.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A display comprising:
a first bus interface for receiving an auxiliary channel;
a first plurality of registers coupled to the auxiliary channel to store information regarding the display; and
a second plurality of registers coupled to the auxiliary channel to store information regarding a host device, the information regarding the host device comprising:
a chip identification identifying one or more integrated circuits of the host.

2. The display of claim 1 further comprising:
a third plurality of registers coupled to the auxiliary channel to store information regarding a branch device.

3. The display of claim 1 wherein the information regarding the display comprises:
an organizationally unique identifier.

4. The display of claim 3 wherein the information regarding the display further comprises:
a chip identification identifying one or more integrated circuits of the display.

5. The display of claim 3 wherein the information regarding the display further comprises:
information regarding major and minor revisions of one or more integrated circuits of the display.

6. The display of claim 3 wherein the information regarding the display further comprises:
information regarding major and minor revisions of firmware used by the display.

7. The display of claim 1 wherein the information regarding a host device further comprises:
an organizationally unique identifier;
information regarding major and minor revisions of one or more integrated circuits of the host; and
information regarding major and minor revisions of firmware used by the host.

8. A display comprising:
a first bus interface for receiving an auxiliary channel;
a first plurality of registers coupled to the auxiliary channel to store information regarding the display;
a second plurality of registers coupled to the auxiliary channel to store information regarding an adapter, the information regarding the adapter comprises:
a chip identification, identifying one or more integrated circuits in the adapter.

9. The display of claim 8 wherein the information regarding the display comprises:
information regarding major and minor revisions of one or more integrated circuits of the display.

10. The display of claim 8 wherein the information regarding the display comprises:
information regarding major and minor revisions of firmware used by the display.

11. The display of claim 8 further comprising:
a third plurality of registers coupled to the auxiliary channel to store information regarding the host.

12. The display of claim 11 wherein the information regarding the host comprises:
an organizationally unique identifier; and
a chip identification, identifying one or more integrated circuits in the host.

13. The display of claim 8 wherein the information regarding the adapter further comprises:
an organizationally unique identifier.

14. The display of claim 8 wherein the information regarding the display comprises:
an organizationally unique identifier; and
a chip identification, identifying one or more integrated circuits in the display.

15. A method of driving a display comprising:
reading information regarding the display from a register on the display, the information regarding the display comprising:
information regarding major and minor revisions of one or more integrated circuits of a host; and
information regarding major and minor revisions of firmware used by a host;
determining whether a workaround exists for a known problem with the display;
implementing the workaround; and
providing data for an image to be displayed on the display.

16. The method of claim 15 further comprising:
determining whether the display has a capability that may be used; and
using the capability.

17. The method of claim 15 further comprising:
using the information regarding the display in an error report.

18. The method of claim 15 further comprising:
using the information regarding the display in a compliance test.

19. The method of claim 15 wherein the information regarding the display further comprises:
an organizationally unique identifier;
a chip identification identifying one or more integrated circuits of the display.

* * * * *